(12) United States Patent
Lindholm et al.

(10) Patent No.: US 8,976,195 B1
(45) Date of Patent: Mar. 10, 2015

(54) GENERATING CLIP STATE FOR A BATCH OF VERTICES

(75) Inventors: John Erik Lindholm, Saratoga, CA (US); Ziyad S. Hakura, Gilroy, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1000 days.

(21) Appl. No.: 12/579,352

(22) Filed: Oct. 14, 2009

(51) Int. Cl.
G09G 5/00 (2006.01)
G06T 15/30 (2011.01)

(52) U.S. Cl.
CPC .................................. G06T 15/30 (2013.01)
USPC ......................................................... 345/623

(58) Field of Classification Search
CPC ................... G06T 15/30; G06T 15/40
USPC .................... 345/421, 620, 623, 622, 624
See application file for complete search history.

(56) References Cited

U.S. PATENT DOCUMENTS

| | | | |
|---|---|---|---|
| 4,375,683 A | 3/1983 | Wensley | |
| 4,967,347 A | 10/1990 | Smith et al. | |
| 5,103,478 A | 4/1992 | Matyas et al. | |
| 5,233,615 A | 8/1993 | Goetz | |
| 5,339,404 A | 8/1994 | Vandling, III | |
| 5,572,620 A | 11/1996 | Reilly et al. | |
| 5,845,060 A | 12/1998 | Vrba et al. | |
| 5,883,641 A * | 3/1999 | Krech et al. .................. 345/505 |
| 6,023,751 A | 2/2000 | Schlansker et al. | |
| 6,128,755 A | 10/2000 | Bello et al. | |
| 6,151,684 A | 11/2000 | Alexander et al. | |
| 6,769,121 B1 | 7/2004 | Koyama et al. | |
| 6,910,173 B2 | 6/2005 | Mitra et al. | |
| 6,943,797 B2 | 9/2005 | Wasserman et al. | |
| 6,950,927 B1 | 9/2005 | Apisdorf et al. | |
| 6,967,664 B1 * | 11/2005 | Taylor et al. ................... 345/620 |
| 7,047,440 B1 | 5/2006 | Freydel et al. | |
| 7,065,672 B2 | 6/2006 | Long et al. | |
| 7,203,878 B2 | 4/2007 | Naegle et al. | |

(Continued)

FOREIGN PATENT DOCUMENTS

| WO | WO 2008/127610 | 10/2008 |
| WO | WO 2008/127622 | 10/2008 |
| WO | WO 2008/127623 | 10/2008 |

OTHER PUBLICATIONS

Wiese; A Finite State Machine Decision Algorithm; ESC 1991 vol. 2, pp. 782-789; 1991.*

(Continued)

*Primary Examiner* — Carlos Perromat
(74) *Attorney, Agent, or Firm* — Artegis Law Group, LLP

(57) ABSTRACT

One embodiment of the present invention sets forth a technique for generating a batch clip state stored in clip state machine (CSM) associated with a batch of vertices. Per-vertex clip state is generated for each vertex in the batch of vertices based on the position of each vertex relative to each clip plane. For a given vertex, per-vertex clip state indicates whether the vertex is inside or outside each of the one or more clip planes. The per-vertex clip states of all the vertices in the batch of vertices are coalesced into a batch clip state by determining whether each vertex in the batch of vertices is inside every clip plane, each vertex is outside at least one clip plane or neither. The batch clip state is stored in the CSM associated with the thread group that processes the batch of vertices that can be accessed by further stages of the graphics pipeline.

26 Claims, 12 Drawing Sheets

(56) References Cited

U.S. PATENT DOCUMENTS

| | | |
|---|---|---|
| 7,292,239 B1 | 11/2007 | Moreton et al. |
| 7,315,310 B2 | 1/2008 | Sakamoto et al. |
| 7,392,426 B2 | 6/2008 | Wolfe et al. |
| 7,466,322 B1 * | 12/2008 | Moreton et al. ............. 345/620 |
| 7,468,726 B1 * | 12/2008 | Wloka et al. ................. 345/421 |
| 7,627,723 B1 | 12/2009 | Buck et al. |
| 7,746,355 B1 | 6/2010 | Cai et al. |
| 8,108,872 B1 | 1/2012 | Lindholm et al. |
| 2001/0025295 A1 | 9/2001 | Kawachiya et al. |
| 2001/0034824 A1 | 10/2001 | Mukherjee et al. |
| 2002/0105519 A1 | 8/2002 | Lindholm et al. |
| 2002/0152419 A1 | 10/2002 | McLoughlin et al. |
| 2003/0131291 A1 | 7/2003 | Morrison et al. |
| 2003/0189565 A1 | 10/2003 | Lindholm et al. |
| 2004/0034856 A1 | 2/2004 | Boudnik et al. |
| 2004/0189650 A1 | 9/2004 | Deering |
| 2004/0263520 A1 | 12/2004 | Wasserman et al. |
| 2005/0216798 A1 | 9/2005 | Yu |
| 2005/0278567 A1 | 12/2005 | Wolfe et al. |
| 2006/0150186 A1 | 7/2006 | Grayevr |
| 2007/0094669 A1 | 4/2007 | Rector et al. |
| 2007/0165035 A1 | 7/2007 | Duluk et al. |
| 2007/0198792 A1 | 8/2007 | Dice et al. |
| 2007/0206027 A1 | 9/2007 | Chen |
| 2007/0260939 A1 | 11/2007 | Kammann et al. |
| 2008/0094412 A1 * | 4/2008 | Jiao et al. ....................... 345/621 |
| 2008/0143730 A1 * | 6/2008 | Lindholm et al. ............ 345/501 |
| 2008/0162770 A1 | 7/2008 | Titiano et al. |
| 2008/0184211 A1 | 7/2008 | Nickolls et al. |
| 2008/0220545 A1 | 9/2008 | Pelley |
| 2009/0002393 A1 * | 1/2009 | Wang ............................ 345/620 |
| 2009/0048857 A1 | 2/2009 | Pepper |
| 2009/0132878 A1 | 5/2009 | Garland et al. |

OTHER PUBLICATIONS

Office Action, U.S. Appl. No. 12/054,322 dated Dec. 14, 2010.
Office Action, U.S. Appl. No. 12/324,645 dated Dec. 14, 2010.
Office Action in U.S. Appl. No. 12/054,322, mailed May 19, 2011.
Office Action, U.S. Appl. No. 12/579,348 dated May 24, 2012.
Moss, et al. "Toward Acceleration of RSA Using 3D Graphics Hardware," LNCS 4887, Dec. 2007, pp. 369-388.
Eggers, et al. "Simultaneous Multithreading: A Platform for Next-Generation Processors," IEEE Micro, vol. 17, No. 5, pp. 12-19, Sep./Oct. 1997.
Office Action, U.S. Appl. No. 13/485,622, dated Aug. 27, 2012.
Office Action, U.S. Appl. No. 12/505,398, dated Aug. 3, 2012.
Office Action, U.S. Appl. No. 13/485,622, dated Feb. 11, 2013.

* cited by examiner

GENERATING CLIP STATE FOR A BATCH OF VERTICES

BACKGROUND OF THE INVENTION

1. Field of the Invention

The present invention generally relates to the field of graphics processing and more specifically to generating a clip state via a clip state machine for a batch of vertices.

2. Description of the Related Art

A graphics processing pipeline of a graphics processing unit (GPU) accepts a representation of a three-dimensional (3D) scene as an input and processes that input to produce a 2D display image of the scene as an output. As is well known, the 3D graphics scene is typically represented by a collection of primitives having vertices. Indices associated with the vertices are stored in index arrays, and vertex data associated with those vertices is stored in vertex arrays. The primitives are individually processed by the GPU based on the index arrays and the vertex data when generating the 2D display image of the scene.

A conventional graphics processing pipeline has different stages through which the primitives associated with a graphics scene are processed when generating the 2D display image of the graphics scene. In one stage, vertex shading operations, including vertex lighting and transformation, are performed on vertices of the graphics primitives. In another stage, a geometry shader performs geometry shading operations for calculating parameters that are used to rasterize the graphics primitives. In a later stage, clipping, culling, viewport transform, and attribute perspective correction operations on the graphics primitives. In this stage, different culling and clipping techniques to remove graphics primitives within the 3D graphics scene that are not visible in a view frustum, i.e., a region of visible space defined by a set of clip planes.

One drawback of a conventional graphics processing pipeline, is that operations in stages prior to the clipping and culling stage are performed for each of the graphics primitives regardless of whether those graphics primitives are clipped or culled downstream. In such a scenario, memory bandwidth and processing resources of the GPU are wasted unnecessarily to process graphics primitives and vertices of those graphics primitives that are discarded at a later stage.

Accordingly, what is needed in the art is a mechanism for identifying vertices that are eventually culled or clipped in a later stage of the graphics processing pipeline.

SUMMARY OF THE INVENTION

One embodiment of the present invention sets forth a method for generating a clip state associated with a set of vertices positioned relative to a plurality of clip planes. The method includes the steps of, for each vertex in the set of vertices, generating a per-vertex clip state based on a position of the vertex relative to each of the plurality of clip planes, and for each plane of the plurality of clip planes, generating a per-plane clip state based on the per-vertex clip state of each vertex in the set of vertices, wherein the per-plane clip state indicates that all of the vertices in the set of vertices are inside the clip plane, all of the vertices are outside the clip plane, or some of the vertices are outside the clip plane and some of the vertices are inside the clip plane. The method also includes the steps of generating the clip state associated with the set of vertices based on the per-plane clip state of at least two of the plurality of clip planes, and updating a clip state machine associated with the set of vertices based on the clip state, wherein the clip state machine is accessible by one or more elements within a graphics processing pipeline to determine whether to process the set of vertices.

One advantage of the disclosed technique is that generating the clip state machine associated with the batch of vertices early in the graphics pipeline allows further stages in the graphics pipeline to conserve processing bandwidth. Additionally, the computational load on the viewport scale, cull and clip unit is reduced as only vertices included in a batch of vertices associated with a "mixed" clip state or a "trivial accept" clip state need to be processed by the viewport scale, cull and clip unit.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
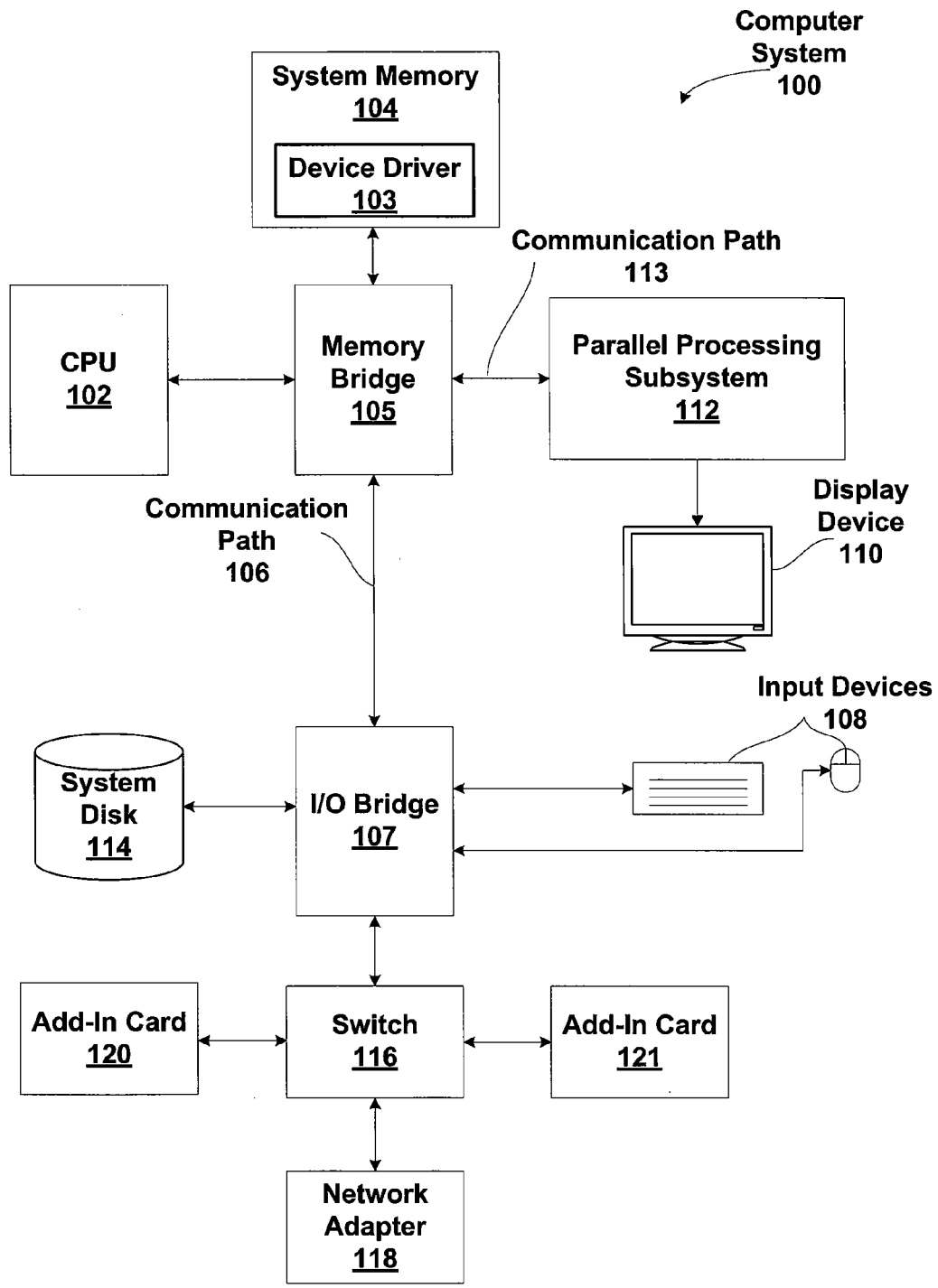
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
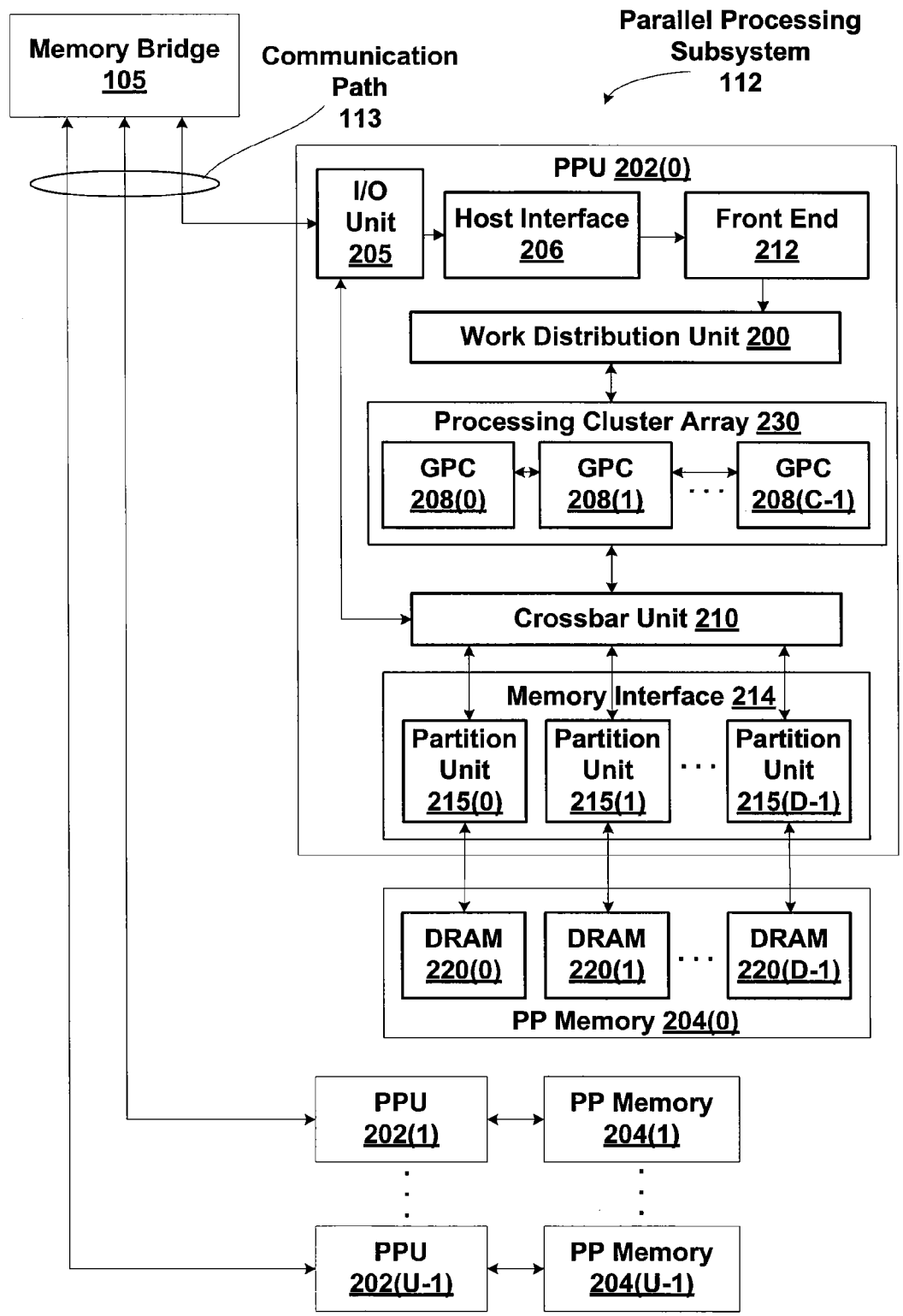
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where $C \geq 1$. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where $D \geq 1$. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
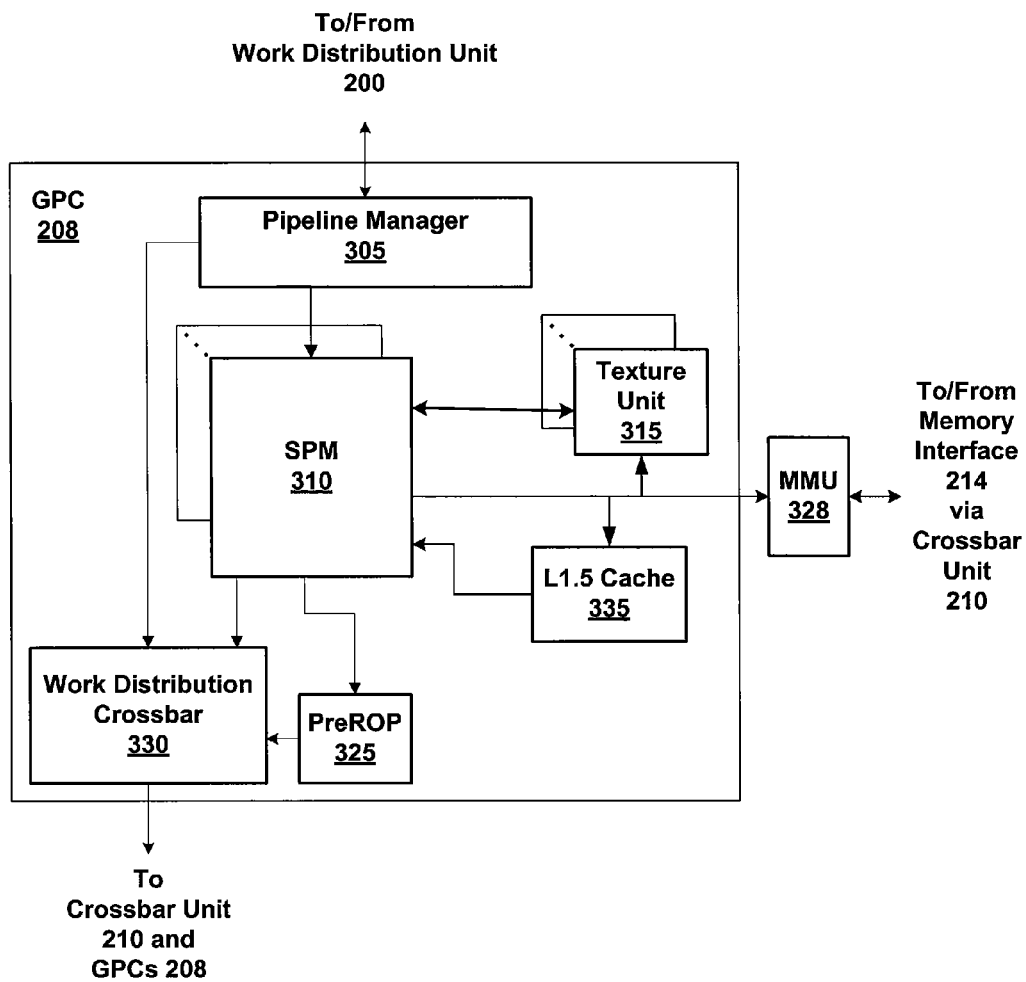
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≥1, each SPM 310 configured to process one or more thread groups. Also, each SPM 310 advantageously includes an identical set of functional execution units (e.g., arithmetic logic units, and load-store units, shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to G*M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

Each SPM 310 contains an L1 cache (not shown) or uses space in a corresponding L1 cache outside of the SPM 310 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. It is to be understood that any memory external to PPU 202 may be used as global memory. Additionally, an L1.5 cache 335 may be included within the GPC 208, configured to receive and hold data fetched from memory via memory interface 214 requested by SPM 310, including instructions, uniform data, and constant data, and provide the requested data to SPM 310. Embodiments having multiple SPMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SPM 310 or the L1 cache or GPC 208. The physical address is processed to distribute surface data access locality to allow efficient request interleaving among partition units. The cache line index may be used to determine whether of not a request for a cache line is a hit or miss.

In graphics and computing applications, a GPC 208 may be configured such that each SPM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SPM 310 and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SPMs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Figure 3B:
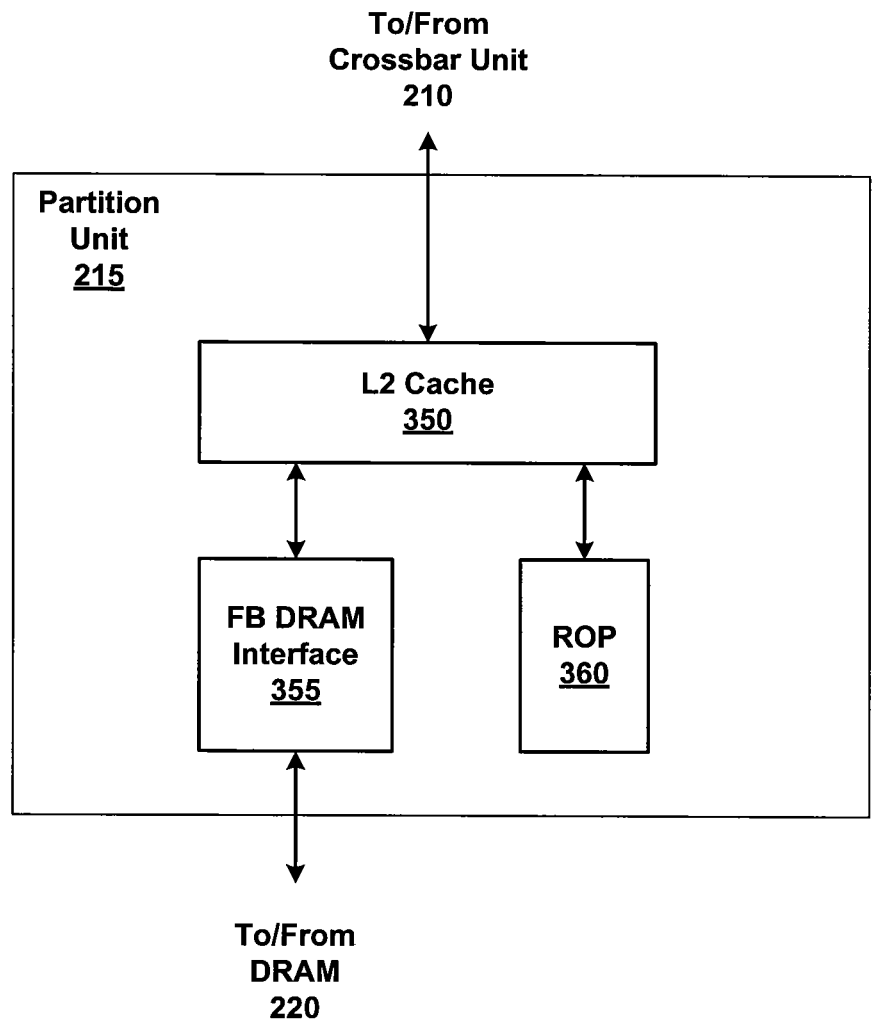
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 122 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
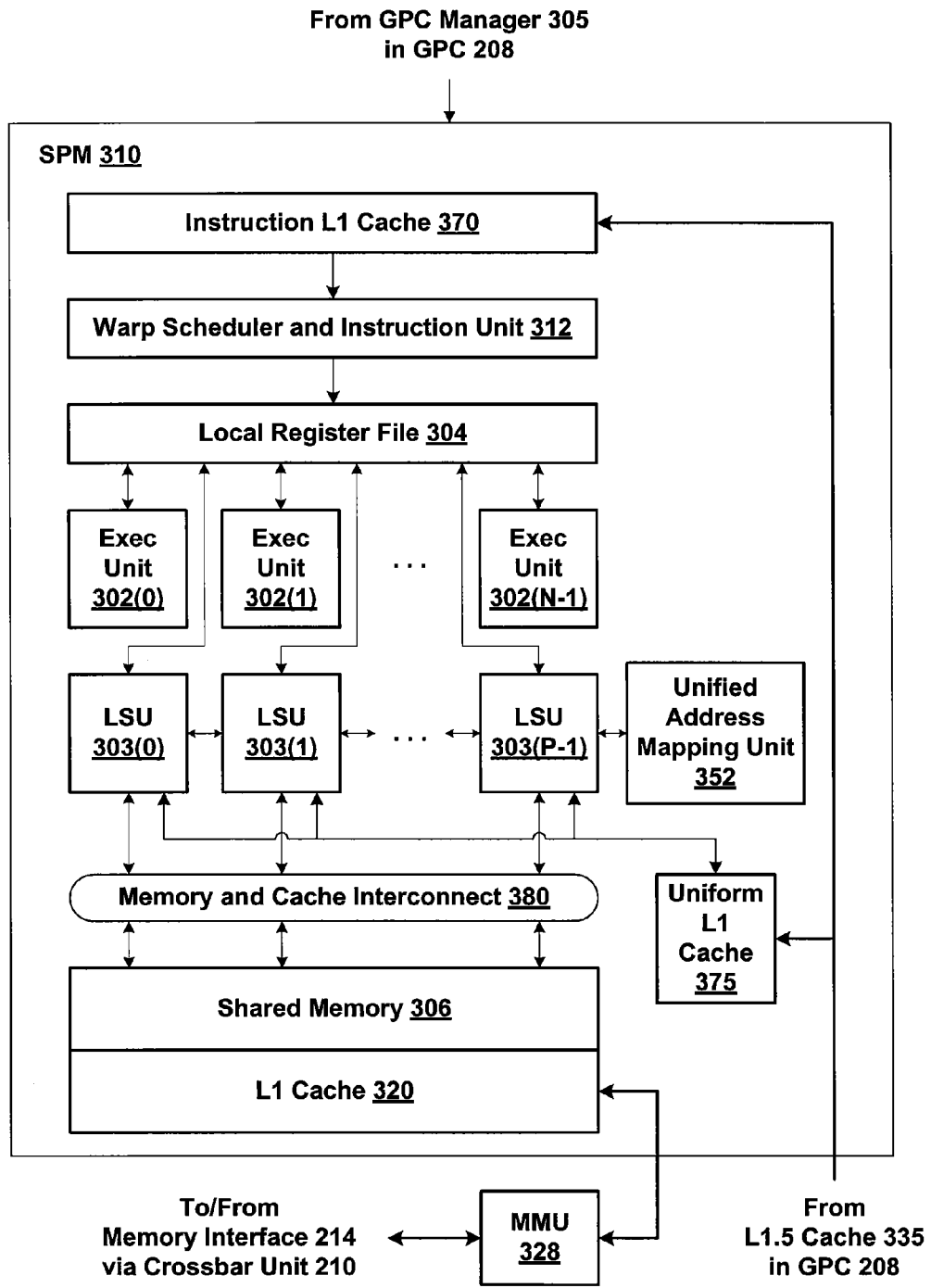
FIG. 3C is a block diagram of a portion of the SPM of FIG. 3A, according to one embodiment of the present invention.

FIG. 3C is a block diagram of the SPM 310 of FIG. 3A, according to one embodiment of the present invention. The SPM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SPM 310 functional units according to the instructions and constants. The SPM 310 functional units include N exec (execution or processing) units 302 and P load-store units (LSU) 303.

SPM 310 provides on-chip (internal) data storage with different levels of accessibility. Special registers (not shown) are readable but not writeable by LSU 303 and are used to store parameters defining each CTA thread's "position." In one embodiment, special registers include one register per CTA thread (or per exec unit 302 within SPM 310) that stores a thread ID; each thread ID register is accessible only by a respective one of the exec unit 302. Special registers may also include additional registers, readable by all CTA threads (or by all LSUs 303) that store a CTA identifier, the CTA dimensions, the dimensions of a grid to which the CTA belongs, and an identifier of a grid to which the CTA belongs. Special registers are written during initialization in response to commands received via front end 212 from device driver 103 and do not change during CTA execution.

A parameter memory (not shown) stores runtime parameters (constants) that can be read but not written by any CTA thread (or any LSU 303). In one embodiment, device driver 103 provides parameters to the parameter memory before directing SPM 310 to begin execution of a CTA that uses these parameters. Any CTA thread within any CTA (or any exec unit 302 within SPM 310) can access global memory through a memory interface 214. Portions of global memory may be stored in the L1 cache 320.

Local register file 304 is used by each CTA thread as scratch space; each register is allocated for the exclusive use of one thread, and data in any of local register file 304 is accessible only to the CTA thread to which it is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers.

Shared memory 306 is accessible to all CTA threads (within a single CTA); any location in shared memory 306 is accessible to any CTA thread within the same CTA (or to any processing engine within SPM 310). Shared memory 306 can be implemented as a shared register file or shared on-chip cache memory with an interconnect that allows any processing engine to read from or write to any location in the shared memory. In other embodiments, shared state space might map onto per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and grid ID, as well as CTA and grid dimensions, implementing portions of the special registers. Each LSU 303 in SPM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 Cache 320 in each SPM 310 can be used to cache private per-thread local data and also per-application global data. In some embodiments, the per-CTA shared data may be cached in the L1 cache 320. The LSUs 303 are coupled to a uniform L1 cache 371, the shared memory 306, and the L1 cache 320 via a memory and cache interconnect 380. The uniform L1 cache 371 is configured to receive read-only data and constants from memory via the L1.5 Cache 335.

Graphics Pipeline Architecture

Figure 4:
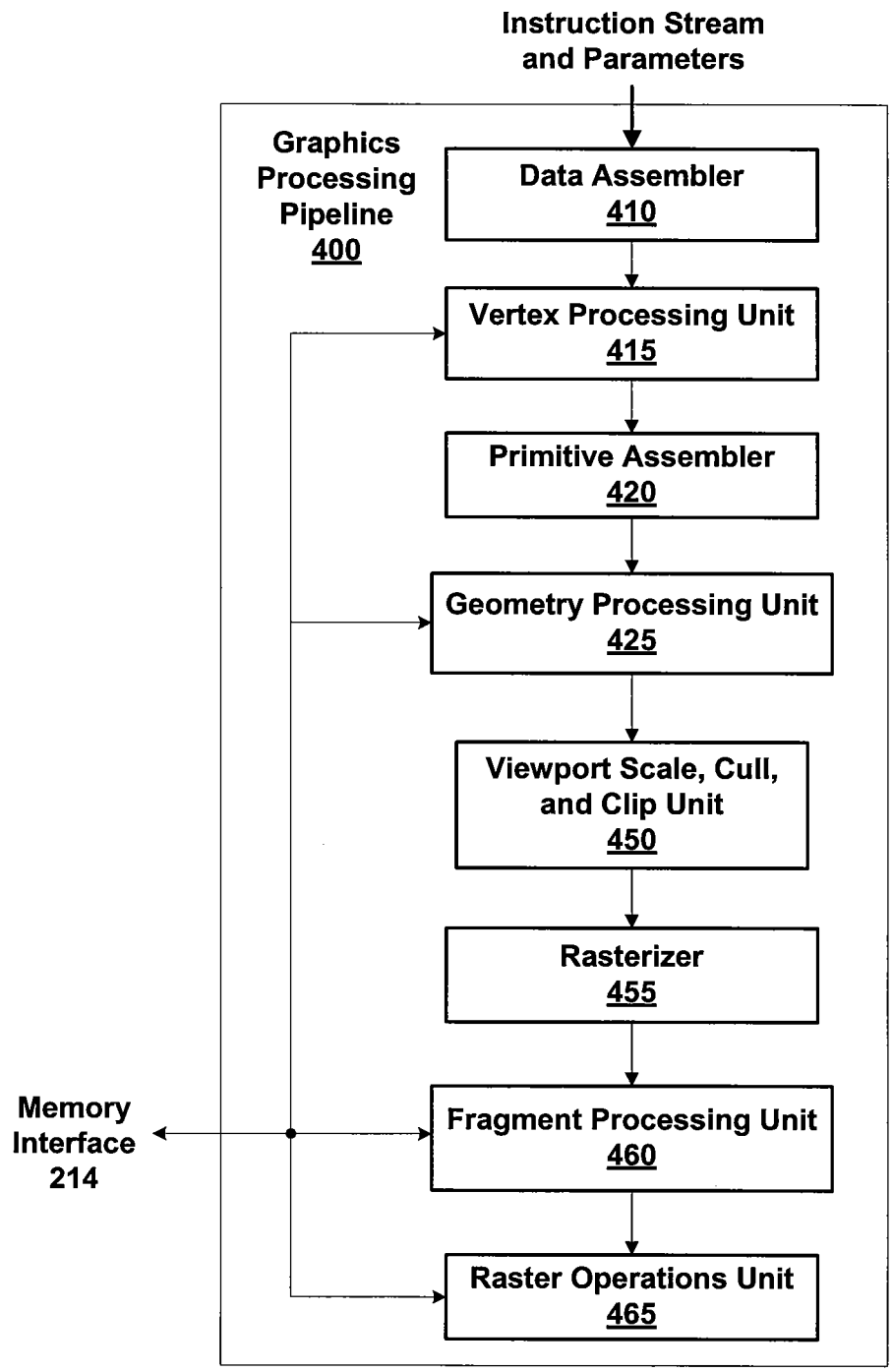
FIG. 4 is a conceptual diagram of a graphics processing pipeline that one or more of the PPUs of FIG. 2 can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the SPMs 310 may be configured to perform the functions of one or more of a vertex processing unit 415, a geometry processing unit 425, and a fragment processing unit 460. The functions of data assembler 410, primitive assembler 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache 320, parallel processing memory 204, or system memory 104 by data assembler 410 for use in processing the vertex data.

Primitive assembler 420 receives vertex attributes from vertex processing unit 415, reading stored vertex attributes, as needed, and constructs graphics primitives for processing by geometry processing unit 425. Graphics primitives include triangles, line segments, points, and the like. Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Generating Clip State Machine for Batch of Vertices

Embodiments of this invention set forth a technique for determining a clip state associated with a set of vertices transmitted from the CPU 202 to the GPC 308. In one embodiment, all the vertices of a given primitive received from the CPU 202 are included in the set of vertices. The clip state associated with the set of vertices indicates whether each vertex in the set of vertices lies inside or outside one or more clip planes defining a region of viewable space. If each vertex in the set of vertices is inside every clip plane, then the clip state is a "trivially accept" clip state indicating that the set of vertices should be processed by further stages in the graphics pipeline. If each vertex in the set of vertices is outside at least one clip plane, then the clip state is a "trivially reject" clip state indicating that the set of vertices should not be processed by further stages in the graphics pipeline. If neither of these conditions is met, then the clip state is a "mixed" clip state indicating that further processing should be performed within the subsequent states of the graphics pipeline to conclusively determine the clip state associated with the set of vertices.

Figure 5A:
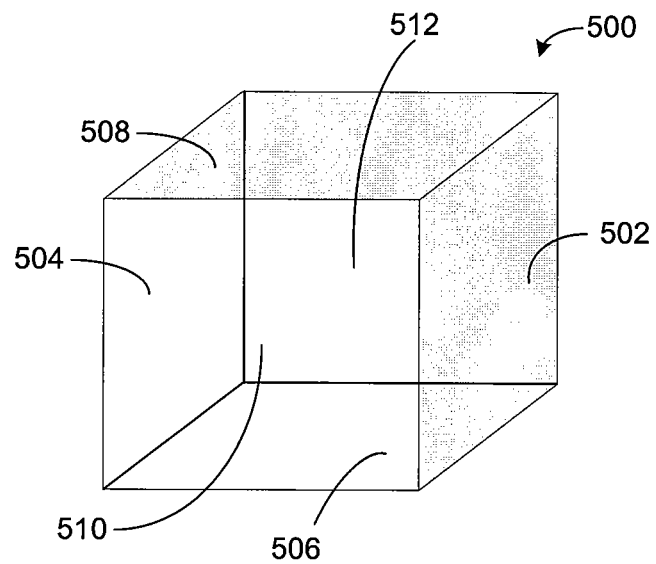
FIG. 5A illustrates an exemplary view frustum indicating a region of space that is visible on the display device of FIG. 1, according to one embodiment of the present invention.

FIG. 5A illustrates an exemplary view frustum 500 indicating a region of space that is visible on the display device 110 of FIG. 1, according to one embodiment of the present invention. As shown, the view frustum 500 has six clip planes including an x-right clip plane 502, an x-left clip plane 504, a y-lower clip plane 506, a y-upper clip plane 508, a z-near clip plane 510 and a z-far clip plane 512. As is well-known, a graphics object or a portion of a graphics object lying outside any one of the six clip planes included in the view frustum 500 is not visible on the display device 100 and therefore is not included in the image being rendered for display.

Figure 5B:
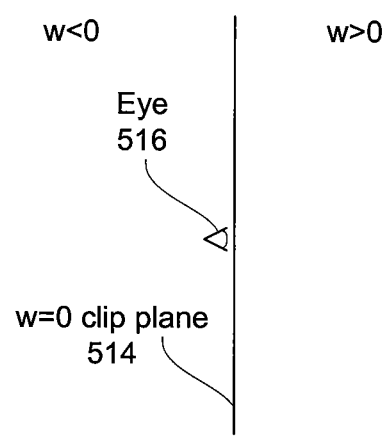
FIG. 5B illustrates a w=0 clip plane in homogeneous space, according to one embodiment of the present invention.

FIG. 5B illustrates a w=0 clip plane 514 in homogeneous space, according to one embodiment of the present invention. As shown, the w=0 clip plane 514 is positioned at a viewpoint, i.e. eye 516. A w>0 region lies to the right of w=0 clip plane 514 and a w<0 region lies to the left of w=0 clip plane 514. As is well-known, a graphics object or a portion of a graphics object lying within the w<0 region (i.e., outside the w=0 clip plane 514) should not be visible to the eye 516 and therefore is not included in the image being rendered for display.

Figure 6A:
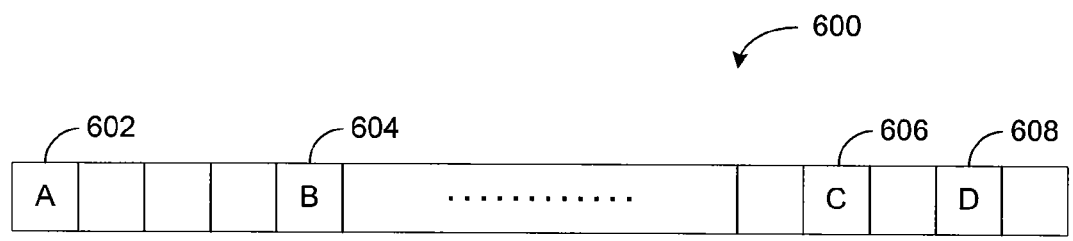
FIG. 6A illustrates a batch of vertices generated by the data assembler 410 of FIG. 4, according to one embodiment of the present invention.

FIG. 6A illustrates a batch of vertices 600 generated by the data assembler 410 of FIG. 4, according to one embodiment of the present invention. As shown, the batch of vertices 600 includes vertices, such as vertex A 602, vertex B 604, vertex C 606 and vertex D 608, of a subset of primitives included in a given set of primitives transmitted from the CPU 202 to the GPC 308. In one embodiment, all the vertices of a given primitive in the subset of primitives are included in the batch of vertices 600. Each vertex in the batch of vertices 600 is processed by a different thread in a thread group executing within an SPM 310. In one embodiment, the thread group includes thirty-two threads and the batch of vertices 600 includes up to thirty-two vertices.

Figure 6B:
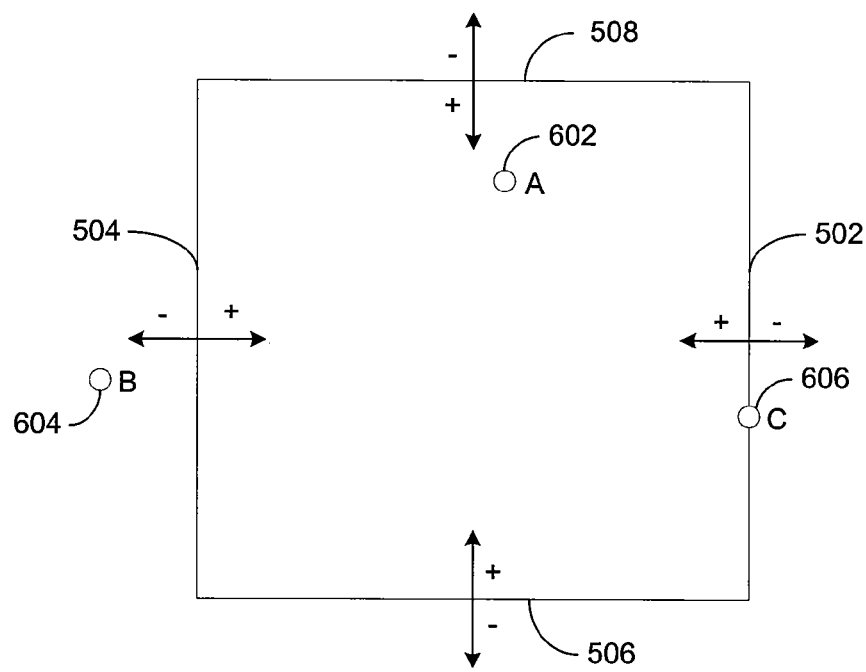
FIG. 6B illustrates the position of different vertices in the batch of vertices of FIG. 6A with respect to four clip planes associated with the view frustum of FIG. 5A, according to one embodiment of the present invention.

FIG. 6B illustrates the position of different vertices in the batch of vertices 600 of FIG. 6A with respect to four clip planes associated with the view frustum 500 of FIG. 5A, according to one embodiment of the present invention. When determining the clip state associated with the batch of vertices, the position (positive or negative) of each vertex in the batch of vertices with respect to each clip plane in the view frustum 500 is evaluated. For purposes of discussion only, if the view frustum 500 only has four clip planes, the x-right clip plane 502, the x-left clip plane 504, the y-lower clip plane 506 and the y-upper clip plane 508, since the position of vertex A is positive from each of the four clip planes, vertex A 602 is inside each of the clip planes and thus inside the view frustum 500. Similarly, since the position of vertex B 604 is positive from x-right clip plane 502, y-lower clip plane 506 and y-upper clip plane 508, but negative from x-left clip plane 504, vertex B 604 is outside at least one clip plane and thus outside the view frustum 500. In one embodiment, when the position of the vertex is on a clip plane (neither positive nor negative from that clip plane), then the vertex is considered as positive from that clip plane. For example, vertex C 606 is neither positive nor negative from x-right clip plane 502, but is considered as positive from clip plane 702.

Figure 7:
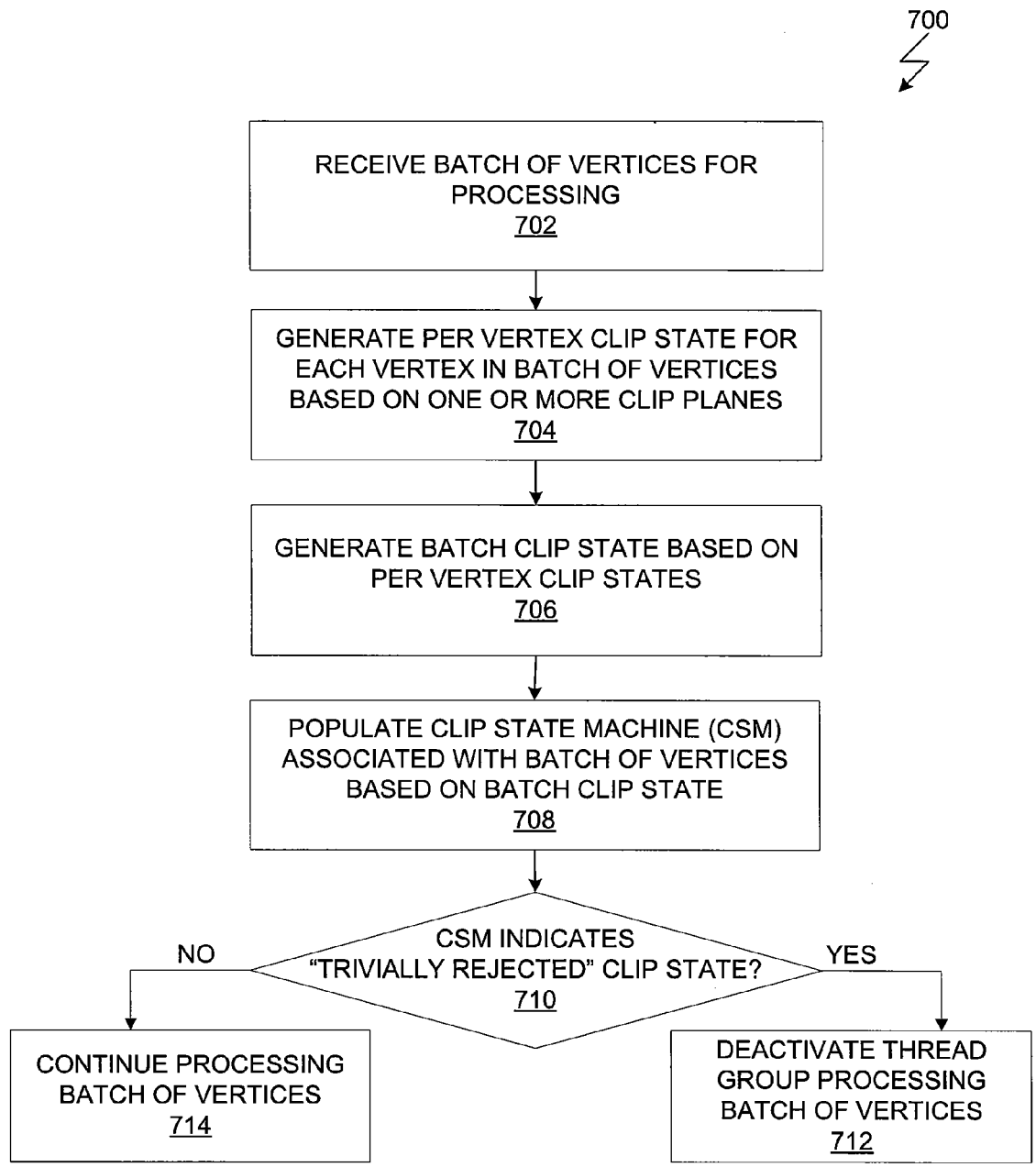
FIG. 7 is a flow diagram of method steps for generating the clip state associated with the batch of vertices, according to one embodiment of the present invention.

FIG. 7 is a flow diagram of method steps for generating the clip state associated with the batch of vertices 600, according to one embodiment of the present invention. Although the method steps are described in conjunction with the systems of FIGS. 1-4, persons skilled in the art will understand that any system configured to perform the method steps, in any order, is within the scope of the invention.

The method 700 begins at step 702, where the vertex processing unit 412 in the graphics pipeline 400 receives the batch of vertices 600 from the data assembler 410. At step 704, the vertex processing unit 412 generates a per-vertex clip state for each vertex in the batch of vertices 600 based on the position of the vertex with respect to one or more clip planes. A clip plane may be one of the clip planes of the view frustum 500 or the w=0 clip plane 514. A clip plane may also be a user-defined clip plane which is an additional clip plane, not necessary perpendicular to the x, y or z axis, against which each vertex in the batch of vertices 600 is clipped. For a given vertex, the per-vertex clip state indicates whether the vertex is inside or outside each of the one or more clip planes. The method steps for generating per-vertex clip state for each vertex in a batch of vertices 600 are described in greater detail below with respect to FIG. 8.

At step 706, the vertex processing unit 412 generates a batch clip state associated with the batch of vertices 600 based on the per-vertex clip states of the vertices in the batch of vertices 600. To generate the batch clip state, the vertex processing unit 412 determines whether each vertex in the batch of vertices 600 is inside every clip plane, each vertex is outside at least one clip plane or neither. If each vertex in the batch of vertices 600 is inside every clip plane, then the batch state clip indicates a "trivially accept" clip state. If each vertex in the batch of vertices 600 is outside at least one clip plane, then the batch state clip indicates a "trivially reject" clip state. If neither of these conditions is met, then the batch state clip indicates a "mixed" clip state.

At step 708, the vertex processing unit 412 populates a clip state machine (CSM) with the batch clip state. The CSM is associated with the thread group processing the batch of vertices 600. The batch clip state stored in the CSM can be accessed by the vertex processing unit 412 and other stages in the graphics processing pipeline 400, including the different shaders, such as the vertex shader, executing as part of the graphics processing pipeline 400. In various embodiments, the CSM may be implemented in hardware, software or a combination of hardware and software. Further, in embodiments where there are multiple thread groups processing different batches of vertices to determine the clip state associated with those batches of vertices, a different CSM may be associated with each such thread group.

When the batch clip state indicates a "trivially accept" clip state, the batch of vertices 600 is processed by further stages in the graphics processing pipeline 400. When the batch clip state indicates a "trivially reject" clip state, the batch of vertices 600 is not processed by further stages in the graphics processing pipeline 400. When the batch clip state indicates a "mixed" clip state, processing is performed by further stages in the graphics processing pipeline 400 to conclusively determine the clip state associated with the batch of vertices 600. The method steps for generating the batch clip state and populating the CSM associated with the thread group that processes the batch of vertices 600 are described in greater detail below with respect to FIG. 9.

At step 710, a pipeline controller (not shown in FIG. 4) that manages the operation of the different units within the graphics processing pipeline 400 determines whether the CSM associated with the thread group that processes the batch of vertices 600 indicates a "trivially rejected" clip state. If the CSM does indicate a "trivially rejected" clip state, then, at step 712, the pipeline controller deactivates the threads within the thread group associated with the batch of vertices 600 so that the threads perform no further processing operations on the vertices in the batch of vertices 600 or associated primitives. In such a scenario, the vertex processing unit 412 as well as other processing units in the graphics processing pipeline 400 that execute different shader programs do not further process the batch of vertices 600. In addition, the viewport scale, cull and clip unit 450 discards the thread group at a later stage in the graphics processing pipeline 400.

In one embodiment, if a tessellation shader program or a geometry shader program is active and configured to change the position of one or more vertices in the batch of vertices 600, then thread group deactivation and vertex clipping are not performed at this stage in the graphics processing pipeline 400.

If, however, the CSM does not indicate a "trivially rejected" clip state, then, at step 714, the pipeline controller does not deactivate the threads within the thread group further processing operations on the vertices in the batch of vertices 600 or associated primitives are performed. In such a scenario, the viewport scale, cull and clip unit 450 determines whether to perform clipping and/or culling operations on primitives associated with the batch of vertices 600 based on the clip state indicated by the CSM associated with the thread group that processes the batch of vertices. If the CSM indicates a "trivially accept" clip state, then the viewport scale, cull and clip unit 450 does not perform any clipping and/or culling operations on primitives associated with the batch of vertices 600 before those primitives are processed by the rasterizer 455. If, however, the CSM indicates a "mixed" clip state, then the viewport scale, cull and clip unit 450 does perform clipping and/or culling operations on primitives associated with the batch of vertices 600 before those primitives are processed by the rasterizer 455.

For purposes of discussion only, the following description provides details for generating a clip state for the batch of vertices 600 with respect to each clip plane of the view frustum 500 and the w=0 clip plane 514 (referred to herein as the "seven clip planes"). Persons skilled in the art will understand that the technique described below can be applied to any other types of clip planes or any other combination of clip planes.

Generating Per-Vertex Clip State

Figure 8:
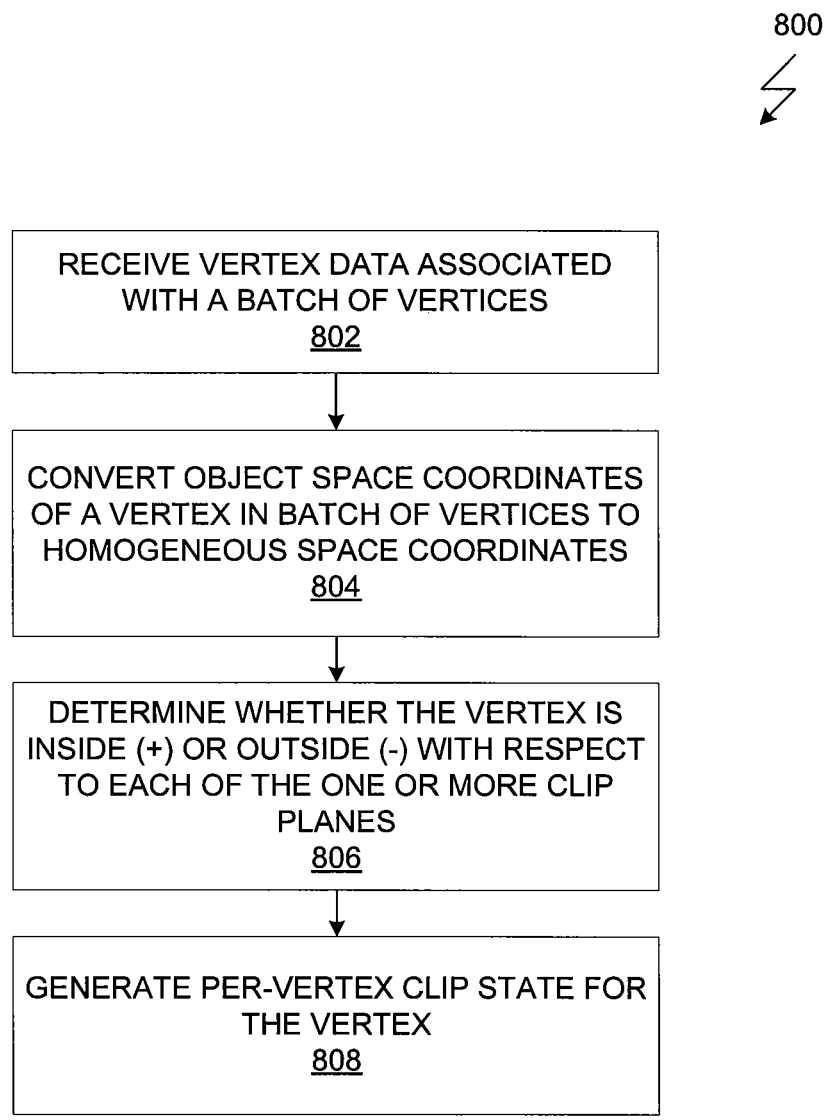
FIG. 8 is a flow diagram of method steps for generating per-vertex clip state information for each vertex in a batch of vertices, according to one embodiment of the present invention.

FIG. 8 is a flow diagram of method steps for generating per-vertex clip state information for each vertex in a batch of vertices, according to one embodiment of the present invention. As set forth above, method 800 is a more detailed description of step 704 of FIG. 7. Although the method steps are described in conjunction with the systems of FIGS. 1-4, persons skilled in the art will understand that any system configured to perform the method steps, in any order, is within the scope of the invention.

The method 800 begins at step 802, where the vertex processing unit 412 receives vertex data associated with each vertex in the batch of vertices 600. For a given vertex, the vertex data, among other attributes, specifies the coordinates (X,Y,Z) of the vertex in object space. At step 804, the vertex processing unit 412 converts the coordinates of a vertex in the batch of vertices 600 from object space (X, Y, Z) to homogeneous clip space (x, y, z, w).

At step 806, the vertex processing unit 412 evaluates the position of the vertex with respect to each of the enabled clip planes of the view frustum 500 and the w=0 clip plane 514, i.e., "the seven clip planes." When determining the position of the vertex with respect to each of the seven clip planes, the vertex processing unit 412 implements either a single-plane processing mode or a dual-plane processing mode. In one embodiment, the vertex processing unit 412 determines the processing mode based on configuration information specified by a shader program executing within the vertex processing unit 412.

In the single-plane processing mode, the vertex processing unit 412 determines the position of the vertex with respect to each of the seven clip planes by evaluating a different operation for each of the seven clip planes. The different operations performed by the vertex processing unit 412 in the single-plane processing mode are shown in Table 1.

TABLE 1

| | Operations |
|---|---|
| 1 | $(w + x) \rightarrow \pm$ |
| 2 | $(w - x) \rightarrow \pm$ |
| 3 | $(w + y) \rightarrow \pm$ |
| 4 | $(w - y) \rightarrow \pm$ |
| 5 | $(w + z) \rightarrow \pm$ |
| 6 | $(w - z) \rightarrow \pm$ |
| 7 | $(w) \rightarrow \pm$ |

Operation $(w+x) \rightarrow \pm$ corresponds to the x-left clip plane 504. For the vertex, if the sign of operation $(w+x) \rightarrow \pm$ is positive or zero, then the vertex is inside the x-left clip plane 504. If, however, the sign of the operation $(w+x) \rightarrow \pm$ is negative, then the vertex is outside the x-left clip plane 504. Operation $(w-x) \rightarrow \pm$ corresponds to the x-right clip plane 502. For the vertex, if the sign of operation $(w-x) \rightarrow \pm$ is positive or zero, then the vertex is inside the x-right clip plane 502. If, however, the sign of the operation $(w-x) \rightarrow \pm$ is negative, then the vertex is outside the x-right clip plane 502.

Similarly, operation $(w+y) \rightarrow \pm$ corresponds to the y-lower clip plane 506. For the vertex, if the sign of operation $(w+y) \rightarrow \pm$ is positive or zero, then the vertex is inside the y-lower clip plane 506. If, however, the sign of the operation $(w+y) \rightarrow \pm$ is negative, then the vertex is outside the y-lower clip plane 506. Operation $(w-y) \rightarrow \pm$ corresponds to the y-upper clip plane 508. For the vertex, if the sign of operation $(w-y) \rightarrow \pm$ is positive or zero, then the vertex is inside the y-upper clip plane 508. If, however, the sign of the operation $(w-y) \rightarrow \pm$ is negative, then the vertex is outside the y-upper clip plane 508.

Operation $(w+y) \rightarrow \pm$ corresponds to the z-near clip plane 510. For the vertex, if the sign of operation $(w+y) \rightarrow \pm$ is positive or zero, then the vertex is inside the z-near clip plane 510. If, however, the sign of the operation $(w+y) \rightarrow \pm$ is negative, then the vertex is outside the z-near clip plane 510. Operation $(w-y) \rightarrow \pm$ corresponds to the z-far clip plane 512. For the vertex, if the sign of operation $(w-y) \rightarrow \pm$ is positive or zero, then the vertex is inside the z-far clip plane 512. If, however, the sign of the operation $(w-y) \rightarrow \pm$ is negative, then the vertex is outside the z-far clip plane 512.

In one embodiment, the z-near clip plane 510 is located at z=0 instead of at z=-w. In such a scenario, the operation corresponding to the z-near clip plane 510 is $(z) \rightarrow \pm$. For the vertex, if the sign of operation $(z) \rightarrow \pm$ is positive or zero, then the vertex is inside the z-near clip plane 510. If, however, the sign of the operation $(z) \rightarrow \pm$ is negative, then the vertex is outside the z-near clip plane 510.

Lastly, operation $(w) \rightarrow \pm$ corresponds to the w=0 clip plane 516. For the vertex, if the sign of operation $(w) \rightarrow \pm$ is positive or zero, then the vertex is inside the w=0 clip plane 516. If, however, the sign of the operation $(w) \rightarrow \pm$ is negative, then the vertex is outside the w=0 clip plane 516.

In one embodiment, the addition operation for each operation in Table 1 is not performed and only the sign of the result of each operation is determined. In another embodiment, if the result of an operation in Table 1 is zero, the vertex is considered as inside the corresponding clip plane.

In the dual-plane processing mode, the vertex processing unit 412 determines the position of the vertex with respect to each of the seven clip planes by evaluating a different operation for each pair of opposite clip planes in the view frustum and one operation for the w=0 clip plane 416. In the view frustum 500, the x-right clip plane 502 and the x-left clip plane 504 are a pair of opposite x-clip planes, and the y-lower clip plane 506 and the y-upper clip plane 508 are a pair of opposite y-clip planes. Similarly, the z-near clip plane 510 and the z-far clip plane 512 are a pair of opposite z-clip planes. The different operations evaluated by the vertex processing unit 412 in the dual-plane processing mode are shown in Table 2.

TABLE 2

| | Operations |
|---|---|
| 1 | $(w + x) \rightarrow \pm$ OR $(w - x) \rightarrow \pm$ |
| 2 | $(w + y) \rightarrow \pm$ OR $(w - y) \rightarrow \pm$ |
| 3 | $(w + z) \rightarrow \pm$ OR $(w - z) \rightarrow \pm$ |
| 4 | $(w) \rightarrow \pm$ |

For the pair of opposite x-clip planes, the vertex processing unit 412 either evaluates operation $(w+x) \rightarrow \pm$ corresponding to the x-right clip plane 502 or operation $(w-x) \rightarrow \pm$ corresponding to the x-left clip plane 504. Determining the sign of the operation not evaluated is trivial and can be inferred based on the sign w and x. Similarly, for the pair of opposite y-clip planes, the vertex processing unit 412 either evaluates operation $(w+x) \rightarrow \pm$ corresponding to the y-lower clip plane 506 or operation $(w-x) \rightarrow \pm$ corresponding to the y-upper clip plane 508. Determining the sign of the operation not evaluated is trivial and can be inferred based on the sign w and y. Lastly, for the pair of opposite z-clip planes, the vertex processing unit 412 either evaluates operation $(w+x) \rightarrow \pm$ corresponding to the z-near clip plane 510 or operation $(w-x) \rightarrow \pm$ corresponding to the z-far clip plane 512. Determining the sign of the operation not evaluated is trivial and can be inferred based on the sign w and z.

Table 3 shows a truth table according to which the vertex processing unit 412 determines which operation for a pair of opposite clip planes needs to be evaluated.

TABLE 3

| w | coordinate c (x, y, or z) | Operation |
|---|---|---|
| + | + | $(w - c) \rightarrow \pm$ |
| + | - | $(w + c) \rightarrow \pm$ |
| - | + | $(w + c) \rightarrow \pm$ |
| - | - | $(w - c) \rightarrow \pm$ |

Specifically, when determining the position of the vertex with respect to the pair of opposite x-clip planes, if the sign of both the w-coordinate and the x-coordinate is positive, then the vertex processing unit 412 only evaluates operation $(w-x) \rightarrow \pm$ since the sign of operation $(w+x) \rightarrow \pm$ is necessarily positive. If, however, the sign of the w-coordinate is positive and the sign of the x-coordinate is negative, then the vertex processing unit 412 only evaluates operation $(w+x) \rightarrow \pm$ since the sign of operation $(w-x) \rightarrow \pm$ is necessarily positive. If the sign of the w-coordinate is negative and the sign of the x-coordinate is positive, then the vertex processing unit 412 only performs operation $(w+x) \rightarrow \pm$ since the sign of operation $(w-x) \rightarrow \pm$ is necessarily negative. Lastly, if the sign of the w-coordinate is negative and the sign of the x-coordinate is negative, then the vertex processing unit 412 only performs operation $(w-x) \rightarrow \pm$ since the sign of operation $(w+x) \rightarrow \pm$ is necessarily negative. In such a manner, the position of the vertex with respect to two opposite x-clip planes, the x-right clip plane 502 and the x-left clip plane 504, is determined by evaluating a single operation.

The vertex processing unit 412 uses Table 3 in a similar manner when determining the position of the vertex with respect to the pair of opposite y-clip planes and the pair of opposite z-clip planes.

In the dual-plane processing mode, the number of operations evaluated by the vertex processing unit 412 to determine the position of the vertex with respect to the seven clip planes is much less than in the single-plane processing mode. Specifically, in the dual-plane processing mode, the vertex processing unit 412 evaluates only four operations, one for each pair of opposite clip planes in the view frustum and one operation for the w=0 clip plane 416. In contrast, in the single-plane processing mode, the vertex processing unit 412 evaluates seven operations, one for each of the seven clip planes.

Once the position of the vertex with respect to each of the seven clip planes is determined, then at step 808, the vertex processing unit 412 generates the per-vertex clip state for the vertex. The per-vertex clip state is a data structure indicating the position of the vertex with respect to each of the seven clip planes, as determined in step 806. In one embodiment, the per-vertex clip state is a seven-bit clip state, where each bit is associated with a different one of the seven clip planes. If the vertex is inside a specific clip plane, then the vertex processing unit 412 sets the bit associated with the specific clip plane in the seven-bit clip state to zero. If, however, the vertex is outside a specific clip plane, then the vertex processing unit 412 sets the bit associated with the specific clip plane to one.

For additional clip planes, such as a user-defined clip plane, the vertex processing unit 412 generates per-vertex clip state indicating whether each vertex is inside or outside the additional clip planes. Specifically, for an additional clip plane having a plane equation of $Ax+By+Cz+Dw=0$, the vertex processing unit 412 performs a floating point calculation based on the plane equation. In one embodiment, the vertex processing unit 412 determines the position of the vertex with respect to more than seven clip planes.

The method steps described in conjunction with FIG. 8 are performed for each vertex in the batch of vertices 600. In one embodiment, the vertex processing unit 412 performs the method steps of FIG. 8 on each thread in the thread group associated with the batch of vertices 600, where each thread corresponds to a different vertex in the batch of vertices 600.

Generating Batch Clip State

Figure 9:
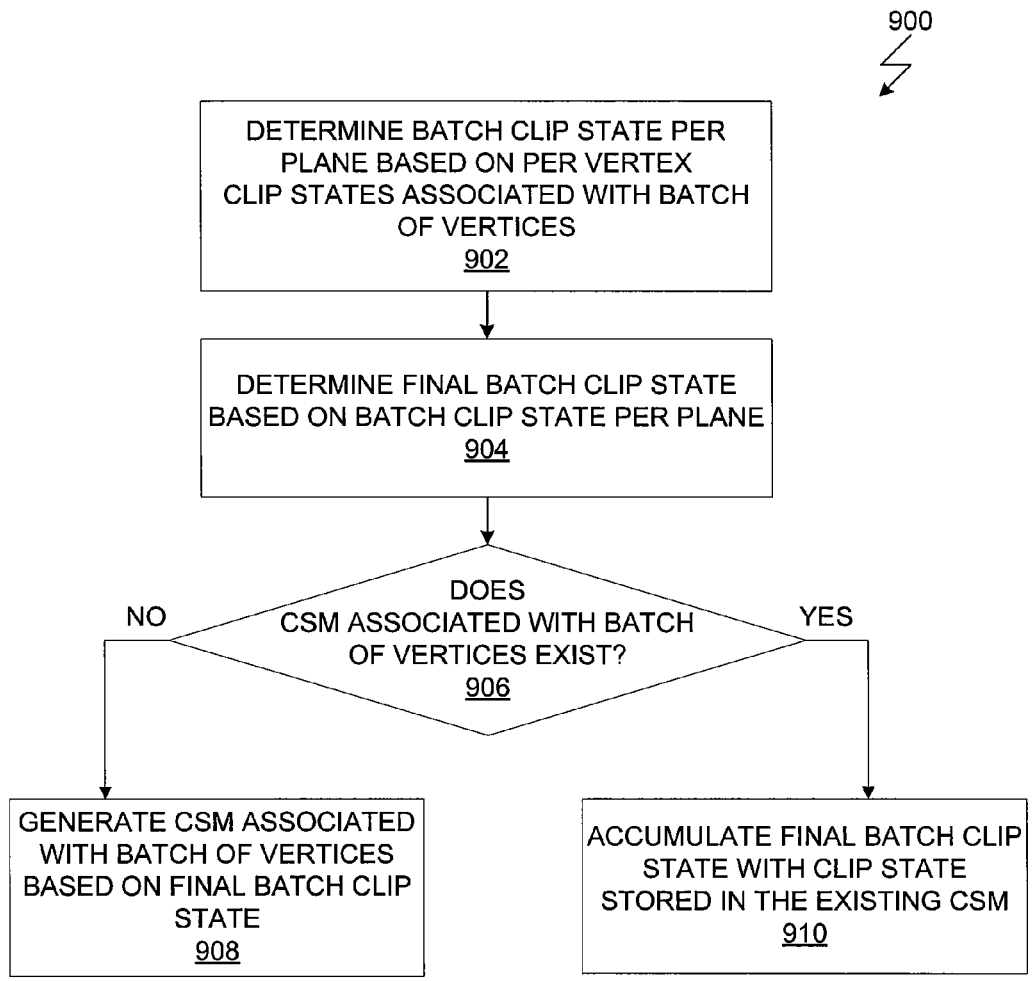
FIG. 9 is a flow diagram of method steps for generating a clip state associated with a batch of vertices, according to one embodiment of the present invention.

FIG. 9 is a flow diagram of method steps for generating a clip state associated with a batch of vertices, according to one embodiment of the present invention. As set forth above, method 900 is a more detailed description of steps 706 and 708 of FIG. 7. Although the method steps are described in conjunction with the systems of FIGS. 1-4, persons skilled in the art will understand that any system configured to perform the method steps, in any order, is within the scope of the invention.

As described herein, the vertex processing unit 412 executes one or more vote instructions across the threads of the thread group that processes the batch of vertices 600 to reduce the per-vertex clip states associated with those vertices to generate the clip state associated with the batch of vertices 600. Details of the vote instructions are set forth in the U.S. patent application titled, "Systems and Methods for Voting among Parallel Threads," filed on Mar. 24, 2008 and having Ser. No. 12/054,322. The subject matter of this related application is hereby incorporated herein by reference.

The method 900 begins at step 902, where the vertex processing unit 412 determines a batch clip state per-plane for each of the seven clip planes based on the per-vertex clip states of the vertices in the batch of vertices 600. For one clip plane, the vertex processing unit 412 determines whether the vertices in the batch of vertices 600 are all inside that clip plane, all outside that clip plane or neither. When all the vertices of the batch of vertices 600 are inside the clip plane, the batch clip state per-plane for that clip plane is "IN." When all the vertices of the batch of vertices 600 are outside the clip plane, the batch clip state per-plane for that clip plane is "OUT." When some of the vertices are inside the clip plane and some vertices are outside the clip plane, the batch clip state per-plane for that clip plane is "MIXED."

In the embodiment where the per-vertex clip state is a seven-bit clip state and each bit in the seven-bit clip state corresponds to a different clip plane, the vertex processing unit 412 processes each clip plane separately to determine the batch clip state per-plane for the clip plane. The vertex processing unit 412 performs a logical AND operation on the bits corresponding to the clip plane across each of the seven-bit clip states of the vertices in the batch of vertices 600. The vertex processing unit 412 also performs a logical OR operation on the bits corresponding to the clip plane across each of the seven-bit clip states of the vertices in the batch of vertices 600.

For the clip plane, the vertex processing unit 412 implements the truth table shown in Table 4 to determine the batch clip state per-plane ("IN", "OUT" or "MIXED") for that clip plane. A "0" result of the AND operation indicates that not all the vertices in the batch of vertices 600 are outside the clip plane. A "0" result of the OR operation indicates that all the vertices in the batch of vertices 600 are inside the clip plane. A "1" result of the AND operation indicates that all the vertices in the batch of vertices are outside the clip plane. A "1" result of the OR operation indicates that at least one vertex in the batch of vertices 600 is outside the clip plane.

TABLE 4

| AND Operation Result | OR Operation Result | Batch Clip State Per-Plane |
|---|---|---|
| 0 | 0 | IN |
| 0 | 1 | MIXED |
| 1 | 0 | NOT POSSIBLE |
| 1 | 1 | OUT |

At step 904, the vertex processing unit 412 determines the final batch clip state associated with the batch of vertices based on the batch clip state per-plane for each of the seven planes. If the batch clip state per plane of each of the seven clip planes is "IN," then the final batch clip state indicates a "trivially accept" clip state. If the batch clip state per-plane of any of the seven clip planes is "OUT," then the final batch clip state indicates a "trivially reject" clip state. For every other combination of batch clip states per-plane of the seven clip planes, the final batch clip state indicates a "mixed" clip state.

At step 906, the vertex processing unit 412 determines whether a clip state machine associated with the thread group processing the batch of vertices 600 exists.

In one embodiment, when the CSM associated with the thread group that processes the batch of vertices 600 is first initialized upon the launch of the thread group, batch clip state stored in the CSM indicates an "uninitialized" clip state.

If, at step 906, a CSM associated with the thread group that processes the batch of vertices 600 does not exist, then the method 900 proceeds to step 908, where the vertex processing unit 412 initializes a CSM associated with the thread group that processes the batch of vertices 600 for storing the final batch clip state determined at step 904. In one embodiment, the CSM is a 2-bit state machine, where 00 indicates a "mixed" clip state, "01" indicates a "trivially accept" clip state, 10 indicates a "trivially reject" clip state and 11 indicates that the CSM is uninitialized. In such a manner, predicates ("0" and "1") are used to store the final batch clip state.

If, at step 906, a CSM associated with the thread group that processes the batch of vertices 600 does already exist, then the method 900 proceeds to step 910, where the vertex processing unit 412 accumulates the final batch clip state determined at step 904 with the batch clip state stored in the existing CSM (old clip state) to generate a new clip state in accordance with Table 5. The new clip state is stored in the CSM associated with the thread group that processes the batch of vertices 600 replacing the old clip state. In such a manner, the batch clip state stored in the CSM can be accumulated across any number of clip planes in the view frustum.

TABLE 5

| Old Clip State | Final Batch Clip State | New Clip State |
|---|---|---|
| Uninitialized | TRIVIALLY ACCEPT | TRIVIALLY ACCEPT |
| Uninitialized | TRIVIALLY REJECT | TRIVIALLY REJECT |
| Uninitialized | MIXED | MIXED |
| MIXED | TRIVIALLY ACCEPT | MIXED |
| MIXED | TRIVIALLY REJECT | TRIVIALLY REJECT |
| MIXED | MIXED | MIXED |
| TRIVIALLY ACCEPT | TRIVIALLY ACCEPT | TRIVIALLY ACCEPT |
| TRIVIALLY ACCEPT | TRIVIALLY REJECT | TRIVIALLY REJECT |
| TRIVIALLY ACCEPT | MIXED | MIXED |
| TRIVIALLY REJECT | TRIVIALLY ACCEPT | TRIVIALLY REJECT |
| TRIVIALLY REJECT | TRIVIALLY REJECT | TRIVIALLY REJECT |
| TRIVIALLY REJECT | MIXED | TRIVIALLY REJECT |

In various implementations, the different threads of the thread group that processes the batch of vertices 600 may access predicate registers when reducing the per-vertex clip state to generate the clip state associated with the batch of vertices 600. Each thread in the thread group accesses a different predicate register. In one embodiment, each predicate register includes 16 bits, allowing seven writable predicates, one constant predicate and at least one condition code to be stored and accessed. The different predicate registers (not shown in FIG. 3C) reside within the SPM 310 separately and distinctly from the local register file 304 but are part of the data flow paths to and from the different execution units 302. The predicate registers also may be used for other operations such as flow control, dynamically select MIN/MAX operations, load/store lock functions, source selection operations, to name a few.

As previously described herein, for an additional clip plane having a plane equation of $Ax+By+Cz+Dw=0$, the vertex processing unit 412 performs a floating point calculation based on the plane equation to generate per-vertex clip state. The vertex processing unit 412 then processes the result of the $Ax+By+Cz+Dw=0$ calculation in a similar manner as discussed above and accumulates the result into a clip state machine associated with the batch of vertices 600.

The clip state stored in the CSM is accessed by the pipeline controller in the graphics processing pipeline 400 to determine whether the batch of vertices and/or associated primitives should be processed by the subsequent stages of the graphics processing pipeline 400. Again, the vertex processing unit 412 as well as other processing units in the graphics processing pipeline 400 that execute different shader programs may access the CSM to determine whether further processing of the batch of vertices 600 is warranted or to perform various processing operations using the stored clip state. For example, one or more threads executing a particular shading program may access the clip state and perform branching or other operations based on the clip state. In addition, as previously described herein, the viewport scale, cull and clip unit 450 can determine whether to discard the thread group based on the clip state stored in the CSM.

Figure 10:
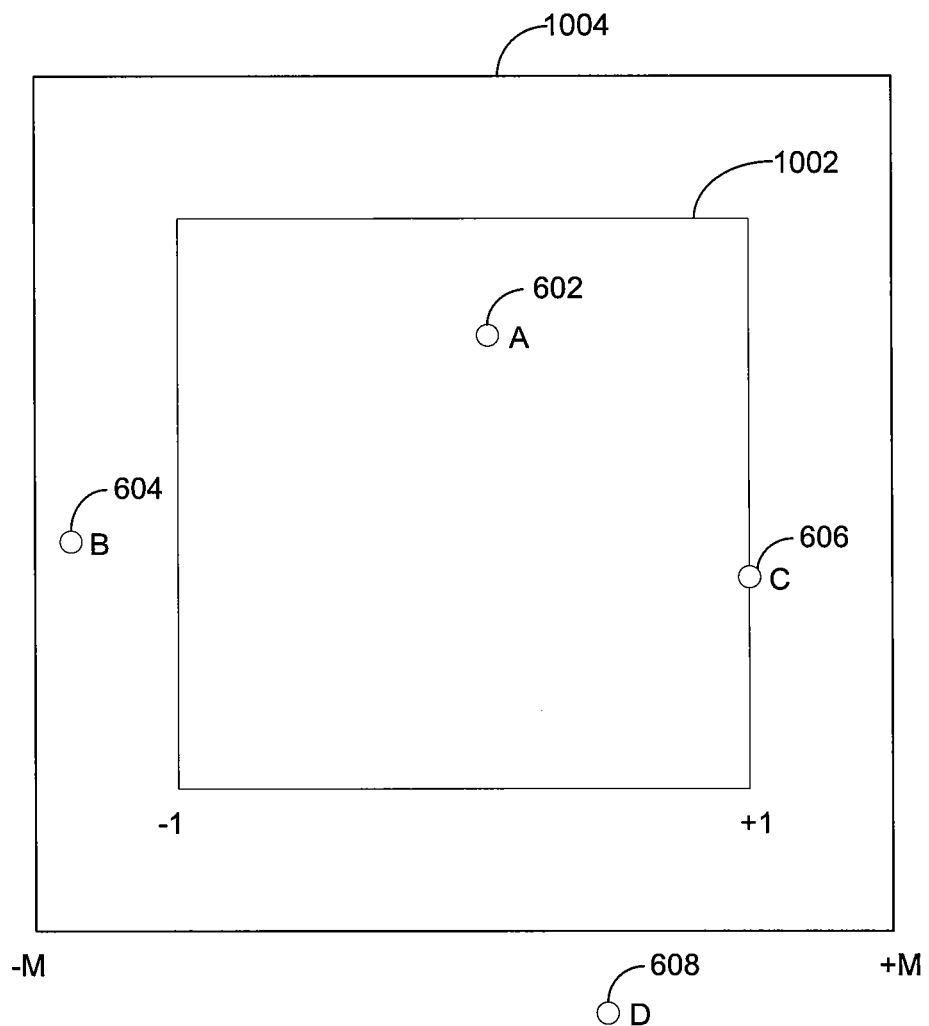
FIG. 10 illustrates a cross section of an inner view frustum and a cross section of a scaled outer view frustum, according to one embodiment of the present invention.

In one alternative implementation, the approach described herein may be applied to a scaled view frustum. FIG. 10 illustrates a cross section of an inner view frustum 1002 and a cross section of a scaled outer view frustum 1004, according to one embodiment of the present invention. As shown, the inner view frustum 1002 is scaled by a factor of M to generate the outer view frustum 1004. The actual value of M is determined based on hardware architecture and limitations.

Scaling the inner view frustum 1002 in such a fashion increases the region of space within which a vertex is considered to be inside the view frustum. When more vertices are considered as inside the view frustum, the load on the viewport scale, cull and clip unit 450 for performing floating point clipping operation decreases and overall efficiency of the system increases if the rasterizer 455 is configured to perform efficient clipping and culling operations. Further, the amount of floating point clipping operations performed by the viewport scale, cull and clip unit 450 are reduced as, in some cases, a batch of vertices having a "MIXED" clip state is treated as having a "TRIVIAL ACCEPT" clip state. In one embodiment, the value of M is determined based on the processing capabilities of the raster operations unit 465 and the processing capabilities of the viewport scale, cull and clip unit 450. In another embodiment, the value of M is either 1 or 256.

When processing the batch of vertices 600 to generate a per-vertex clip state indicating whether each vertex is inside or outside each clip plane of the scaled outer view frustum 1004 and the w=0 clip plane 514, the vertex processing unit 412 implements the same techniques previously described herein with respect to FIG. 8. However, the operations corresponding to the seven clip planes are modified to reflect the scaling factor of M. The modified operations are shown in Table 6.

TABLE 6

| | Operations |
|---|---|
| 1 | (Mw + x) → ± |
| 2 | (Mw − x) → ± |
| 3 | (Mw + y) → ± |
| 4 | (Mw − y) → ± |
| 5 | (Mw + z) → ± |
| 6 | (Mw − z) → ± |
| 7 | (w) → ± |

In another alternative implementation, an inner clip state machine (ICSM) associated with the batch of vertices 600 is generated for the inner view frustum 1002 and an outer clip state machine (OCSM) with the batch of vertices 600 is generated for the outer view frustum 1004. In such an implementation, if the ICSM indicates a "trivially rejected" clip state, then each vertex in the batch of vertices 600 is outside the inner view frustum 1002. If the OCSM indicates a "trivially accepted" clip state, then each vertex in the batch of vertices 600 is inside the outer view frustum 1004. In one embodiment, the ICSM and the OCSM can be combined in accordance with Table 7 to establish a more accurate combined batch clip state associated with the batch of vertices 600.

TABLE 7

| ICSM | OCSM | Combined Clip State |
|---|---|---|
| MIXED | TRIVIALLY ACCEPT | TRIVIALLY ACCEPT |
| MIXED | TRIVIALLY REJECT | TRIVIALLY REJECT |
| MIXED | MIXED | MIXED |
| TRIVIALLY ACCEPT | TRIVIALLY ACCEPT | TRIVIALLY ACCEPT |
| TRIVIALLY ACCEPT | TRIVIALLY REJECT | Not Possible |
| TRIVIALLY ACCEPT | MIXED | Not Possible |
| TRIVIALLY REJECT | TRIVIALLY ACCEPT | TRIVIALLY REJECT |
| TRIVIALLY REJECT | TRIVIALLY REJECT | TRIVIALLY REJECT |
| TRIVIALLY REJECT | MIXED | TRIVIALLY REJECT |

In an alternative embodiment, when determining the position of a vertex with respect to the seven clip planes in the dual-processing mode, the vertex processing unit 412 evaluates the operation (w)→± corresponding to the w=0 clip plane 416 when evaluating another operation corresponding to a pair of opposite clip planes. In such an embodiment, only three operations need to be evaluated when determining the position of the vertex with respect to the seven clip planes.

In an alternative implementation, finer granularity culling operations may be performed by the SPM 310 based on the per-vertex clip state of each vertex in the batch of vertices 600.

In another alternative embodiment, when determining the final batch clip state associated with the batch of vertices 600, the clip planes that affect the outcome of the final batch clip state can be selected. In such an embodiment, the batch clip state per-plane of each of the clip planes that is not selected is masked and, therefore, not used when determining the final batch clip state.

In another alternative embodiment, the clip state stored in the CSM may be filtered such that the actual batch clip state is masked and a "MIXED" clip state is returned when the CSM is accessed by a shading program or processing stage in the graphics processing pipeline. For example, in a situation where a vertex shader program being executed by the vertex processing unit 412 is followed by a stream output instruction, the batch of vertices needs to be written to output buffers in memory and therefore cannot be culled. In such a scenario, if the batch clip state were to indicate a "TRIVIALLY REJECT" clip state, then a "MIXED" clip state would be returned when the vertex shading program accesses the clip state stored in the CSM.

In various embodiments, both the actual clip state and the filtered clip state may be stored in and accessed from the CSM. Such decisions may be made available to shading program developers via an API/compiler framework. For example, a developer can designate that the filtered clip state is returned whenever the clip state stored in the CSM is accessed. With such an approach, shading programs executing downstream of the vertex processing unit (as well as subsequent portions of the vertex shading program) would always receive the vertex data associated with a batch of vertices and would be able to perform additional processing operations on those vertices. Otherwise, the batch of vertices could be culled, which would require the vertex shading program to be recompiled to remove the culling instructions from the vertex shading program. Alternatively, the developer can designate that the actual clip state be accessed from the CSM or that both the actual and the filtered clip states be accessed from the CSM.

In other alternative embodiments, the techniques described herein may be applied when testing on different types of information, other than the position information, associated with the batch of vertices including color information, memory addresses information, size of data, to name a few. Specifically, the result of any test that generates an inside (positive or zero)/outside (negative) result can be accumulated in a clip state machine. For example, the results of front/back face culling operations performed on a batch of vertices based on the signed area associated with the batch of vertices can be accumulated in a clip state machine or a similar data structure. In addition, persons skilled in the art will recognize that the techniques described herein are not limited to a batch of vertices and may be applied to any other group of data objects.

In sum, a clip state machine storing a batch clip state associated with a batch of vertices is generated. First, per-vertex clip state is generated for each vertex in the batch of vertices based on the position of each vertex with respect to one or more clip planes. For a given vertex, per-vertex clip state indicates whether the vertex is inside or outside each of the one or more clip planes. Second, the per-vertex clip states of all the vertices in the batch of vertices are coalesced into a batch clip state by determining whether each vertex in the batch of vertices is inside every clip plane, each vertex is outside at least one clip plane or neither. If each vertex in the batch of vertices is inside every clip plane, then the batch state clip indicates a "trivially accept" clip state and the batch of vertices is processed by following stages in the graphics pipeline. If each vertex in the batch of vertices is outside at least one clip plane, then the batch state clip indicates a "trivially reject" clip state and the batch of vertices is not processed by following stages in the graphics pipeline. If neither of these conditions is met, then the batch state clip indicates a "mixed" clip state and further processing is performed by following stages in the graphics pipeline to conclusively determine the clip state. Third, the batch clip state is stored in the clip state machine (CSM) associated with the batch of vertices. The CSM can be accessed by the different stages of the graphics pipeline, including the current stage, to determine the batch clip state associated with the batch of vertices.

One advantage of the disclosed technique is that generating the clip state machine associated with the batch of vertices early in the graphics pipeline allows further stages in the graphics pipeline to conserve processing bandwidth. Additionally, the computational load on the viewport scale, cull and clip unit is reduced as only vertices included in a batch of vertices associated with a "mixed" clip state or a "trivial accept" clip state need to be processed by the viewport scale, cull and clip unit.

Although the method steps are described in conjunction with the systems of FIGS. 1, 2, 3A, 3B, and 3C, persons skilled in the art will understand that any system configured to perform the method steps, in any order, is within the scope of the inventions.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

We claim:

1. A computer-implemented method for generating per-vertex clip state for a plurality of vertices positioned relative to a plurality of clip planes, the method comprising:
   determining position coordinates associated with a first batch of vertices based on vertex data received from a data assembly unit, wherein each vertex in the first batch of vertices is associated with a different thread of a group of threads simultaneously executing on a processing unit, and wherein the vertices included in the first batch of vertices are associated with one or more primitives;
   determining a set of operations corresponding to the plurality of clip planes that needs to be evaluated based on whether current processing mode indicates a single-plane processing mode or a dual-plane processing mode;
   evaluating the set of operations using the position coordinates to determine a position of each vertex in the first batch of vertices relative to each of the plurality of clip planes;
   generating a per-vertex clip state for each vertex in the first batch of based on the position of each vertex in the first batch of vertices relative to each of the plurality of clip planes, wherein a different portion of each per-vertex clip state indicates whether the corresponding vertex is inside or outside each of the plurality of clip planes;
   determining that each of the per-vertex clip states for each vertex in the first batch of vertices comprises a trivially reject clip state;
   discarding the first batch prior to performing operations for viewport scaling for the first batch; and
   masking the trivially reject clip state for a shading program that is processing data associated with the first batch of vertices, to cause the shading program to process the first batch of vertices.

2. The method of claim 1, wherein the current processing mode is a single-plane processing mode and the set of operations includes a different operation corresponding to each of the plurality of clip planes.

3. The method of claim 1, wherein the current processing mode is a dual-plane processing mode and the set of operations includes a first operation corresponding to at least two of the plurality of clip planes.

4. The method of claim 1, wherein the step of determining position coordinates associated with the first batch of vertices comprises converting object-space coordinates into homogeneous clip space coordinates.

5. The method of claim 1, wherein the step of evaluating the set of operations comprises the step of evaluating a first operation in the set of operations corresponding to a first clip plane of the plurality of clip planes.

6. The method of claim 5, wherein the step of evaluating the first operation comprises the step of determining that the sign of a result of the first operation is positive indicating that a first vertex included in the first batch of vertices is inside the first clip plane.

7. The method of claim 5, wherein the step of evaluating the first operation comprises the step of determining that the sign of a result of the first operation is negative indicating that a first vertex included in the first batch of vertices is outside the first clip plane.

8. The method of claim 1, wherein the plurality of clip planes comprises six clip planes of a view frustum, a w=0 clip plane and one or more user-defined clip planes.

9. The method of claim 8, wherein the current processing mode is a dual-plane processing mode and the set of operations include a first operation corresponding to a pair of opposite clip planes in the six clip planes.

10. The method of claim 1, further comprising:
determining whether at least one vertex included in the set of vertices is located within at least one clip plane in the plurality of clip planes; and
transmitting the set of vertices to a later stage in a graphics processing pipeline for processing if at least one vertex included in the set of vertices is located within at least one clip plane in the plurality of clip planes, or
flagging the set of vertices to not be processed by a later stage in the graphics processing pipeline if none of the vertices included in the set of vertices is located within at least one clip plane in the plurality of clip planes.

11. The method of claim 1, wherein discarding the first batch causes the first batch to not arrive at a viewport cull, scale, and clip unit.

12. A non-transitory computer-readable storage medium storing instructions that, when executed by a processing unit, cause the processing unit to generate per-vertex clip state for a plurality of vertices positioned relative to a plurality of clip planes, by performing the steps of:
determining position coordinates associated with a first batch of vertices based on vertex data received from a data assembly unit, wherein each vertex in the first batch of vertices is associated with a different thread of a group of threads simultaneously executing on a processing unit, and wherein the vertices included in the first batch of vertices are associated with one or more primitives;
determining a set of operations corresponding to the plurality of clip planes that needs to be evaluated based on whether current processing mode indicates a single-plane processing mode or a dual-plane processing mode;
evaluating the set of operations using the position coordinates to determine a position of each vertex in the first batch of vertices relative to each of the plurality of clip planes;
generating a per-vertex clip state for each vertex in the first batch of vertices based on the position of each vertex in the first batch of vertices relative to each of the plurality of clip planes, wherein a different portion of each per-vertex clip state indicates whether the corresponding vertex is inside or outside each of the plurality of clip planes;
determining that each of the per-vertex clip states for each vertex in the first batch of vertices comprises a trivially reject clip state;
discarding the first batch prior to performing operations for viewport scaling for the first batch; and
masking the trivially reject clip state for a shading program that is processing data associated with the first batch of vertices, to cause the shading program to process the first batch of vertices.

13. The computer-readable storage medium of claim 12, wherein the current processing mode is a single-plane processing mode and the set of operations includes a different operation corresponding to each of the plurality of clip planes.

14. The computer-readable storage medium of claim 12, wherein the current processing mode is a dual-plane processing mode and the set of operations includes a first operation corresponding to at least two of the plurality of clip planes.

15. The computer-readable storage medium of claim 12, wherein the step of determining position coordinates associated with the first batch of vertices comprises converting object-space coordinates into homogeneous clip space coordinates.

16. The computer-readable storage medium of claim 12, wherein the step of evaluating the set of operations comprises the step of evaluating a first operation in the set of operations corresponding to a first clip plane of the plurality of clip planes.

17. The computer-readable storage medium of claim 16, wherein the step of evaluating the first operation comprises the step of determining that the sign of a result of the first operation is positive indicating that a first vertex included in the first batch of vertices is inside the first clip plane.

18. The computer-readable storage medium of claim 17, wherein the step of evaluating the first operation comprises the step of determining that the sign of a result of the first operation is negative indicating that the first vertex is outside the first clip plane.

19. The computer-readable storage medium of claim 12, wherein the plurality of clip planes comprises six clip planes of a view frustum.

20. The computer-readable storage medium of claim 19, wherein the current processing mode is a dual-plane processing mode and the set of operations include a first operation corresponding to a pair of opposite clip planes in the six clip planes.

21. The non-transitory computer-readable storage medium of claim 12, wherein the instructions further cause the processing unit to:
generate a per-batch clip state based on the per-vertex clip state for each vertex in the first batch of vertices; and
store the per-batch clip state in a clip state machine associated with the group of threads.

22. The non-transitory computer-readable storage medium of claim 21, wherein the per-batch clip state includes a plurality of per-plane clip states.

23. The non-transitory computer-readable storage medium of claim 22, wherein each per-plane clip state in the plurality of per-plane clip states includes two bits that indicate a per-batch-per-plane clip state for each vertex in the first batch of vertices.

24. The non-transitory computer-readable storage medium of claim 23, wherein each per-vertex clip state includes a bit for each clip plane in the plurality of clip planes, and wherein the instructions further cause the processing unit to, for a clip plane in the plurality of clip planes, perform both an AND operation and an OR operation across the bits associated with each vertex in the batch of vertices and associated with the clip plane, to generate the per-plane clip state.

25. A computing device, comprising:
a data assembly unit; and
a vertex processing unit configured to:
determine position coordinates associated with a first batch of vertices based on vertex data received from a data assembly unit, wherein each vertex in the first batch of vertices is associated with a different thread of a group of threads simultaneously executing on a processing unit, and wherein the vertices included in the first batch of vertices are associated with one or more primitives, determine a set of operations corresponding to a plurality of clip planes that needs to be evaluated based on whether current processing mode indicates a single-pane processing mode or a dual-plane processing mode, evaluate the set of operations using the position coordinates to determine a position of each vertex in the first batch of vertices relative to each of the plurality of clip planes, generate a per-vertex clip state for each vertex in the first batch of vertices based on the position of each vertex in the first batch of vertices relative to each of the plurality of clip planes, wherein a different portion of each per-vertex clip state indicates whether the corresponding vertex is inside or outside each of the plurality of clip planes, determine that each of the per-vertex clip states for each vertex in the first batch of vertices comprises a trivially reject clip state, discard the first batch prior to performing operations for viewport scaling for the first batch; and masking the trivially reject clip state for a shading program that is processing data associated with the first batch of vertices, to cause the shading program to process the first batch of vertices.

26. The graphics processing system of claim 25, wherein the current processing mode is a dual-plane processing mode and the set of operations includes a first operation corresponding to at least two of the plurality of clip planes.

* * * * *